United States Patent [19]

Morita et al.

[11] Patent Number: 4,762,459
[45] Date of Patent: Aug. 9, 1988

[54] INDUSTRIAL ROBOT

[75] Inventors: Hirobumi Morita, Shiki; Yoshiro Fukui, Fujimi, both of Japan

[73] Assignee: Honda Giken Kogyo Kabushiki Kaisha, Tokyo, Japan

[21] Appl. No.: 836,373

[22] Filed: Mar. 5, 1986

[30] Foreign Application Priority Data

| Mar. 6, 1985 | [JP] | Japan | 60-42852 |
| Mar. 7, 1985 | [JP] | Japan | 60-43603 |
| Dec. 23, 1986 | [JP] | Japan | 60-287940 |
| Dec. 23, 1986 | [JP] | Japan | 60-287941 |

[51] Int. Cl.⁴ .................................. B25J 17/02
[52] U.S. Cl. ........................ 414/680; 248/654; 901/22; 901/28
[58] Field of Search ............... 414/680, 735, 733, 718, 414/728; 901/22, 28, 29; 248/653, 654; 182/2

[56] References Cited

U.S. PATENT DOCUMENTS 4,417,845 11/1983 Burton ............................. 414/718

FOREIGN PATENT DOCUMENTS 984857 12/1983 U.S.S.R. ............................. 414/735

Primary Examiner—Robert J. Spar
Assistant Examiner—Donald W. Underwood
Attorney, Agent, or Firm—Armstrong, Nikaido, Marmelstein & Kubovcik

[57] ABSTRACT

An expandable and contractable robot arm is vertically provided on a machine base through a first universal joint, with X and Y horizontal axes being defined passing through the center of rotation of the joint crossing each other at right angles and a vertical Z axes being defined as a longitudinal axis of the arm passing through the center of rotation of the joint. A pair of driving sources are provided on the machine base and connected to the arm for causing the arm to incline in the X axis direction along an X-Z plane define by the X and Z axes and in the Y axis direction along a Y-Z plane defined by the Y and Z axes. A tool attaching plate is mounted on the upper end of the arm through a second universal joint having its center of rotation positioned on the Z axis. A parallel ruler mechanism is provided between the attaching plate and the machine base so as to keep the posture of the attaching plate constant.

4 Claims, 12 Drawing Sheets

INDUSTRIAL ROBOT

BACKGROUND OF THE INVENTION

This invention relates to an industrial robot used for welding, automatic assembling or the like.

Conventional types of robots of this kind can be roughly classified into two groups, that is, a first group including rectangular coordinate type units and a second group including joint type units. It has been usual to use a joint type unit in the case where installation space cannot be widely secured.

However, using the conventional joint type robot, in order to move a tool attached thereto linearly in the vertical direction and in the horizontal direction, while keeping a given posture thereof constant, it has been necessary that, as shown in FIG. 1, a turning table a has mounted thereon a first arm b which is tiltable in front and rear directions, a second arm c on an upper end of the first arm b which is tiltable in upper and lower directions, and a tool e attached to a forward end of the second arm c through a wrist mechanism d having a construction permitting movement in at least two axes. Thus a complicated robot results requiring the control of at least five (5) axes of movement in total.

OBJECT AND SUMMARY OF THE INVENTION

This invention has for its object to provide a robot which is simple in construction and is sufficient while requiring a small installation space and which can give almost the same motions as above to a tool attached thereto.

For achieving the foregoing object, this invention is characterized in that an expandable and contractable robot arm is provided vertically on a machine base through a universal joint. Assuming that horizontal axes passing through the center of rotation of the universal joint and crossing at right angles one to another are X and Y axes, and a longitudinal axis of the arm passing through the center of rotation thereof is a Z axis, a pair of driving sources for causing the arm to incline in the X axis direction along on a X-Z plane defined by the X and Z axes and in the Y axis direction along on a X-Z plane defined by the Y and Z axes are also provided on the machine base so that the arm may be moved to incline in any desired direction by the cooperation of the two driving sources. In addition, a tool attaching plate is attached to an upper end of the arm through a universal joint having its center of rotation positioned on the Z axis. The attaching plate is so arranged as to keep a constant posture by a parallel rule mechanism provided between the attaching plate and the machine base.

BRIEF EXPLANATION OF THE DRAWINGS

The above and the other objects and the attendant advantages of the present invention will become readily apparent by reference to the following detailed drawings when considered in conjunction with the accompanied drawings wherein.

Figure 1:
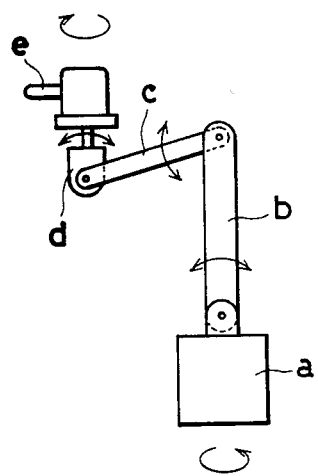
FIG. 1 is a schematic diagram showing a conventional joint type robot.
Figure 2:
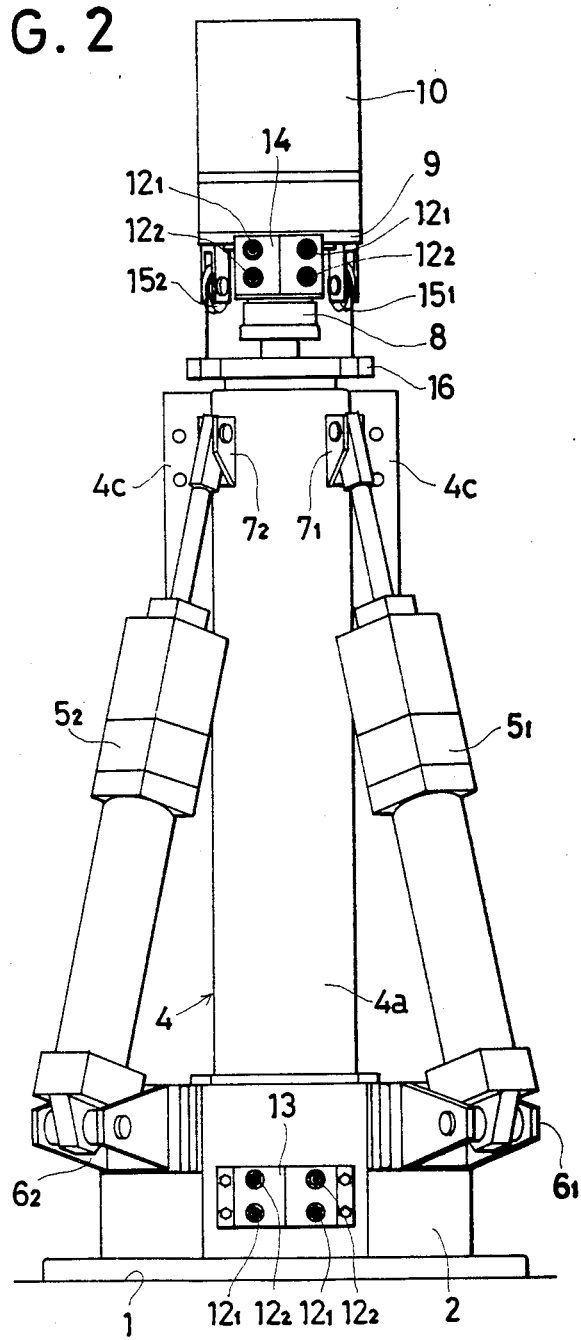
FIG. 2 is a front view of a first embodying example of the robot of this invention.
Figure 8:
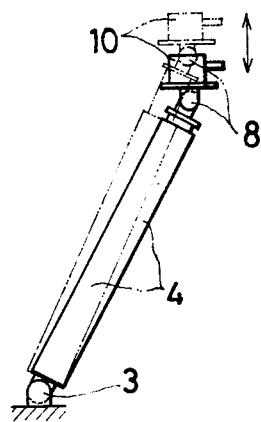

DETAILED DESCRIPTION OF THE PREFERRED EMBODIMENT:

Referring to FIGS. 2 and 8, a machine frame 2 is fixedly provided on a machine base 1. An expandable and contractable robot arm 4 is provided vertically on the machine base 1 therethrough an universal joint 3 attached to the machine frame 2.

Assuming that horizontal axes passing through the center of rotation of the universal joint 3 and crossing at right angles one to another are X and Y axes (FIGS. 4 and 6), and the longitudinal axis of the arm 4 passing through the center of rotation is a Z axis (FIG. 3), a pair of driving sources $5_1$, $5_2$ for causing the arm 4 to incline in the X axis direction along on a X-Z plane defined by the X and Z axes and in the Y axis direction along on a Y-Z plane defined by the Y and Z axes are provided on the machine base 1, so that the arm 4 may be moved to incline in any desired direction, about the universal joint 3, by the cooperation of the two driving sources $5_1$, $5_2$.

Figure 5:
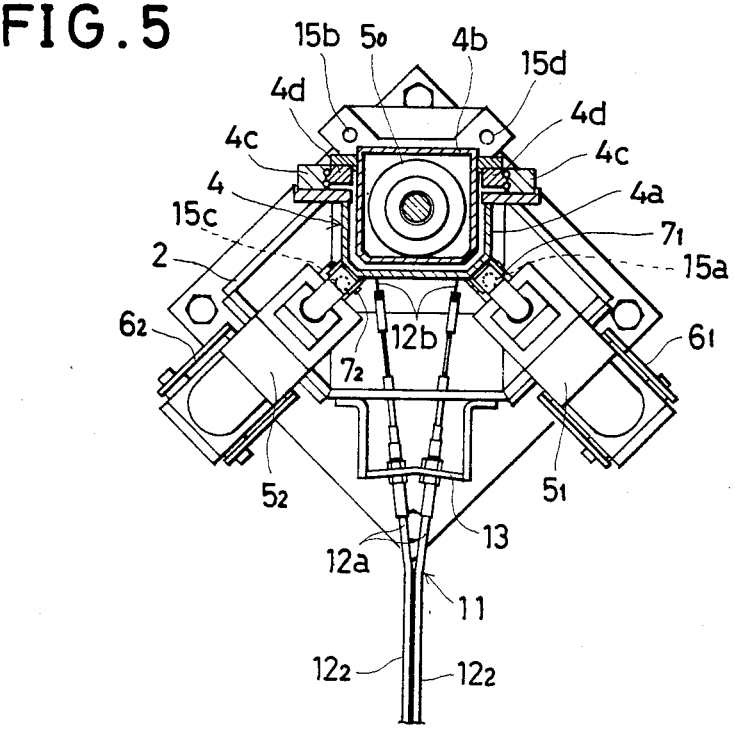

More in detail, in the illustrated example, the arm 4 comprises a lower arm 4a connected to the universal joint 3, and an upper arm 4b supported movably upwards and downwards along the lower arm 4a, so that the arm 4 may be expanded and contracted by elevating and lowering movement of the uppper arm 4b caused by an elevating cylinder $5_0$ provided vertically in the lower arm 4a. Here, as clearly shown in FIG. 5, the lower arm 4a is formed into a channel-shape in horizontal cross section, with its one side surface, for instance, being open forwards. A pair of linear guide members 4c, 4c extending longitudinally in the vertical direction are fixedly provided on both sides of the open portion thereof. The upper arm 4b is supported by rails 4d, 4d provided on both sides thereof on the linear guide members 4c, 4c as to be moved vertically along on the same.

The foregoing driving sources $5_1$, $5_2$ comprise respective cylinders which are located in pair on the X-Z plane and the Y-Z plane, respectively, and are so disposed between the periphery of the lower arm 4a and the machine base 1 as to interconnect the two.

More in detail, in order that a first cylinder $5_1$ constituting one of the two driving sources may be positioned on the X-Z plane, and a second cylinder $5_2$ constituting the other of the two driving sources may be positioned on the Y-Z plane, respective brackets $6_1$, $6_2$ for pivotally supporting lower ends of the respective cylinders $5_1$, $5_2$ are attached to a periphery wall portion, in the X and Y axis direction, of the machine frame 2. Respective brackets $7_1$, $7_2$ for pivotally supporting upper ends of piston rods of the respective cylinders $5_1$, $5_2$ are attached to a periphery portion, in the X axis direction, and a periphery portion, in the Y axis direction, of an upper end portion of the lower arm 4a.

The bracket $6_1$ pivotally supporting the lower end of the first cylinder $5_1$ is arranged to be turnable about the X axis in relation to the machine frame 2 through a bearing 6a. The bracket $6_2$ pivotally supporting the lower end of the second cylinder $5_2$ is arranged to be turnable about the Y axis in relation to the machine frame 2 through another similar bearing 6a.

By this arrangement, the lower arm 4a may be given an inclination movement in the X axis direction simply by operation of the first cylinder $5_1$, and an inclination movement in the Y axis direction simply by operation of the second cylinder $5_2$, and by a composition of these inclination movement, the lower arm 4a, accordingly, the robot arm 4 may be free to move to incline in any desired direction.

These cylinders $5_1$, $5_2$ and the foregoing elevating cylinder $5_0$ are so contemplated that each may be given a positioning control by such a simple construction that a magnetic scale is applied to each of the piston rods thereof. For achieving this, each cylinder is provided with a pick-up 5a for each magnetic scale and a brake 5b cooperating therewith.

Additionally, a tool attaching plate 9 is attached to an upper end of the robot arm 4, that is, an upper end of the upper arm 4b, through a universal joint 8 having its center of rotation located on the Z axis. Any desired tool 10 such as a welding gun or the like is detachably attached to the attaching plate 9.

In addition, the tool attaching plate 9 is so arranged as to be kept in a constant posture by a parallel ruler mechanism 11 provided between the plate 9 and the machine base 1. In the illustrated example, the mechanism 11 is constructed using push-pull type cables.

Figure 3:
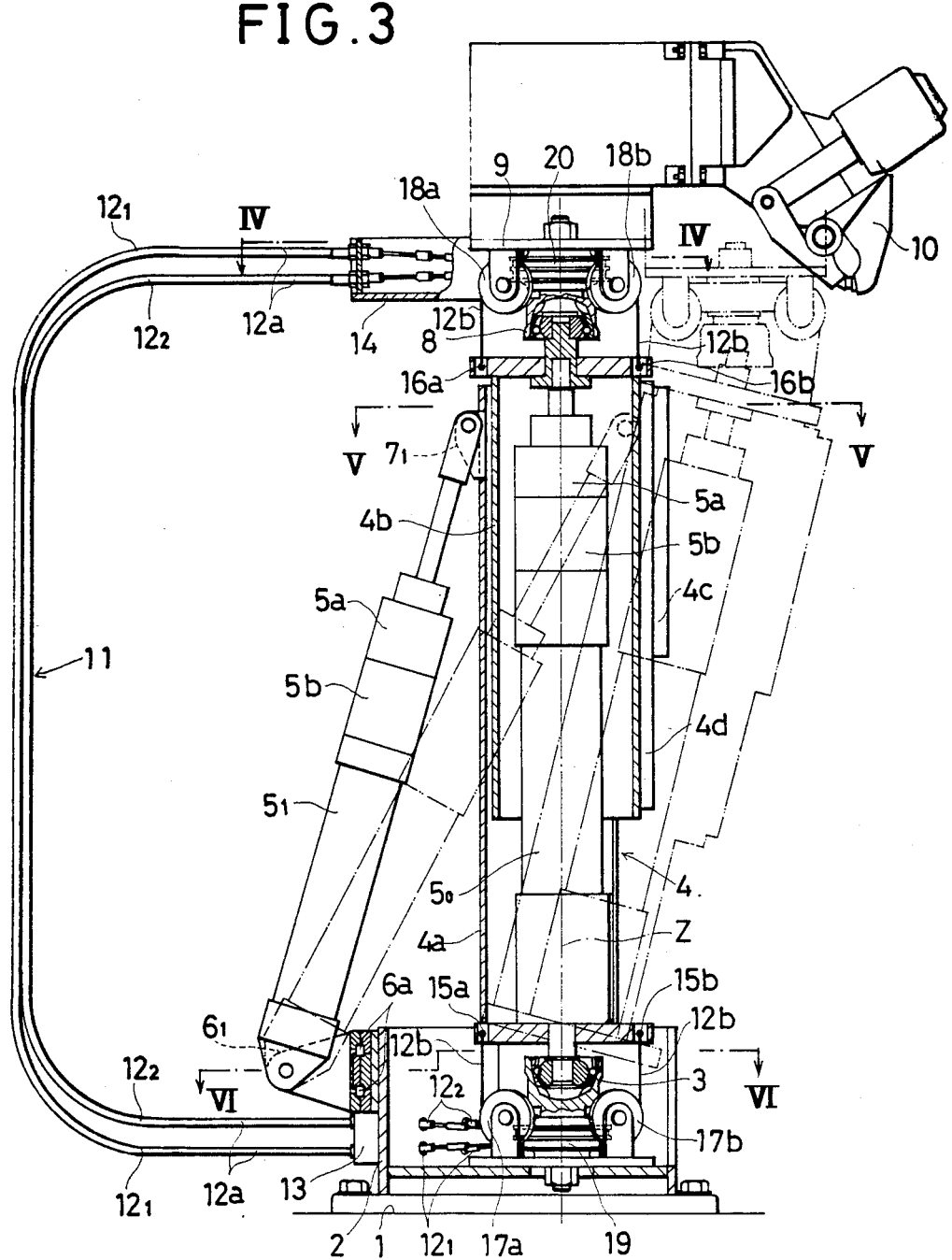
FIG. 3 is a sectional side view of the foregoing exemplified robot taken along the line III—III in FIG. 4.
Figure 4:
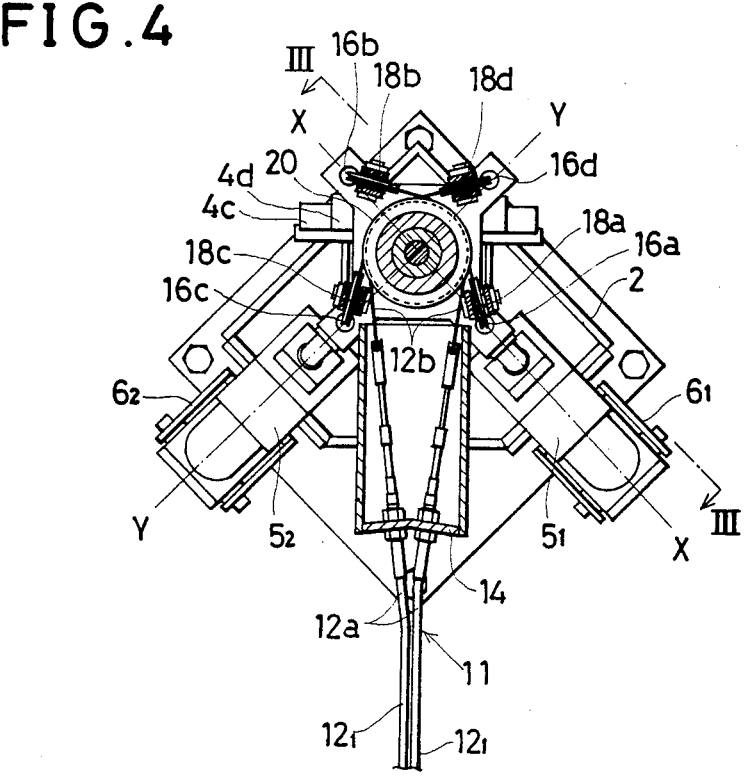
FIGS. 4-6 are sectional views taken along the lines IV—IV-VI—VI in FIG. 3.
Figure 6:
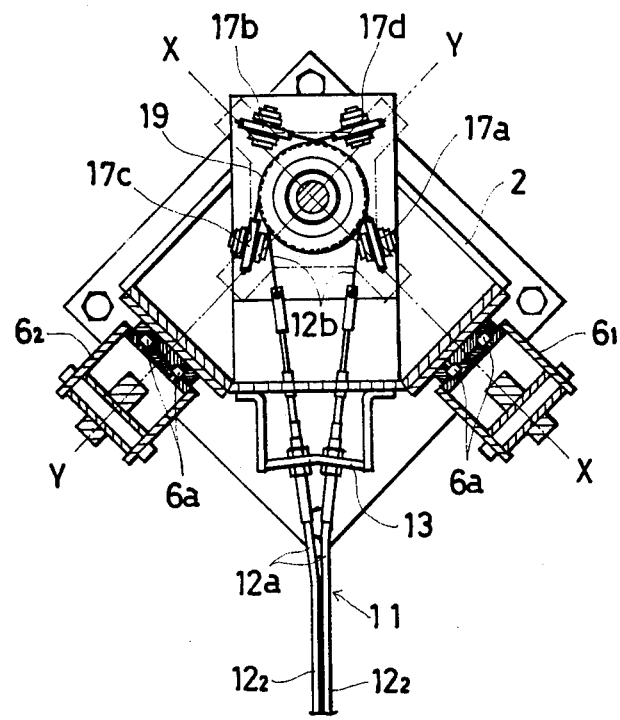

More in detail, a pair of first wire cables $12_1$, $12_1$ for keeping a parallel condition of the attaching plate 9 in relation to the X axis direction and a pair of second wire cables $12_2$, $12_2$ for keeping a parallel condition of the attaching plate 9 in relation to the Y axis direction are wired between the attaching plate 9 and the machine frame 2 on the machine base 1. Both end portions of an outer tube 12a of each of those wire cables are anchored to respective cable anchoring members 13, 14 provided respectively on the machine frame 2 and the attaching plate 9. Additionally, as shown in FIGS. 3 and 6, a lower end and an upper end of the arm 4 are provided with a pair of first wire anchoring portions 16a, 16b, each pair thereof being positioned on both sides, in the X axis direction, of the Z axis, that is, the axis of the arm 4 connecting between the foregoing two universal joints 3, 8, and a pair of second wire anchoring portions 15c, 15d and a pair of second wire anchoring portions 16c, 16d, each pair thereof being positioned on both sides, in the Y axis direction, of the Z axis. Additionally the machine frame 2 is provided with respective wire guide members 17a, 17b, 17c, 17d comprising respective pulleys and facing the respective anchoring portions 15a, 15b, 15c, 15d provided on the lower end of the arm 4. The attaching plate 9 is provided with respective wire guide members 18a, 18b, 18c, 18d comprising respective pulleys and facing the respective anchoring portions 16a, 16b, 16c, 16d provided on the upper end of the arm 4. Additionally, both end portions of an inner wire 12b of one of the foregoing pair of first wire cables $12_1$, $12_1$ are anchored to the respective anchoring portions 15a, 16a on one side in the X axis direction, through the respective guide members 17a, 18a facing those portions 15a, 16a, and both end portions of an inner wire 12b of the other thereof are similarly anchored to the respective anchoring portions 15b, 16b on the other side in the X axis direction through the guide members 17b, 18b. In addition, both end portions of an inner wire 12b of one of the foregoing pair of second wire cables $12_2$, $12_2$ are anchored to the respective anchoring portions 15c, 16c on one side in the Y axis direction, and both end portions of an inner wire 12b of the other thereof are anchored to the respective anchoring portions 15d, 16d on the other side in the Y axis direction.

In the illustrated example, guide drums 19, 20, each having upper and lower guide grooves, are attached to respective center portions of the machine frame 2 and the tool attaching plate 9, and the inner wires 12b, 12b of the first wire cables $12_1$, $12_1$ are introduced, through one of the guide groove of each of the drums 19, 20, to the wire guide members 17a, 18a and 17b, 18b on one side in the X axis direction and on the other side with the same direction. The inner wires 12a, 12a of the second wire cables $12_2$, $12_2$ are introduced, through the other of the guide grooves of each of the drums 19, 20, to the respective wire guide member 17c, 18c and 17d, 18d on one side in the Y axis direction and on the other side in the same direction.

When the robot arm 4 is moved to incline forwards in the X axis direction, as shown by double-dotted lines in FIG. 3, for instance, by the action of the first cylinder $5_1$, the wire anchoring portion 15a on the rear side, in the X axis direction, on the lower end of the arm 4 is moved in such a direction that the same goes further from the wire guide member 17a facing the same on the machine frame 2, and in accordance therewith the inner wire 12b of one of the first wire cables $12_1$, $12_1$ which is anchored at its one end to the anchoring portion 15a, is pulled. Thus, a space between the wire anchoring portion 16a on the rear side, in the X axis direction, on the upper end of the arm 4, which anchors the other end of the inner wire 12b, and the wire guide member 18a facing the same on the tool attaching plate 9 is decreased. In addition, the wire anchoring portion 15b on the front side, in the X axis direction, of the lower end of the arm 4 is moved in such a direction that the same comes near to the wire guide member 17b facing the same on the machine frame 2, and in accordance therewith the inner wire 12b of the other of the first wire cables $12_1$, $12_1$, which is anchored at its one end to the anchoring portion 15b, is slackened. Thus, a space between the wire anchoring portion 16b on the front side in the X axis direction on the upper end of the arm 4, which anchors the other end of the inner wire 12b, and the wire guide member 18b facing the same on the tool attaching plate 9 is increased.

Thus, even if the upper end surface of the arm 4 is inclined forwards and downwards by the inclination movement of the arm 4, the attaching plate 9 can be kept in its horizontal posture in the X axis direction. In such a case that the arm 4 is moved to incline in the Y axis direction by the second cylinder $5_2$, the horizontal posture of the attaching plate 9 moved in the Y axis direction can be ensured in almost the same manner as above by the action of the second wire cables $12_2$, $12_2$.

Also, in any occasion of inclination movement of the arm 4 in any desired direction, the attaching plate 9 can be kept in its horizontal posture which is in parallel with the X-Y plane defined by the X and Y axes, and the working tool 10 attached thereto can keep a constant posture.

At the time of expansion and contraction movements of the arm 4, only the relative positioning of the outer tube 12a of each of the cables $12_1$, $12_2$ is changed, and a pulling operation of the inner wire 12b does not result, and thus the attaching plate 9 can be kept in its horizontal posture.

In the foregoing first embodiment, the upper arm 4b is formed into a tubular one surround the elevating cylinder $5_0$. With this arrangement, it cannot be avoided that a piping installation to the upper end portion of the elevating cylinder $5_0$ or to the brake 5b therefor is carried out through the interior of the upper arm 4b. This causes a problem in that the foregoing piping installation becomes round-about and complicated, and the upper arm 4b is increased in weight which can result in a slow operation speed of the robot.

Figure 9:
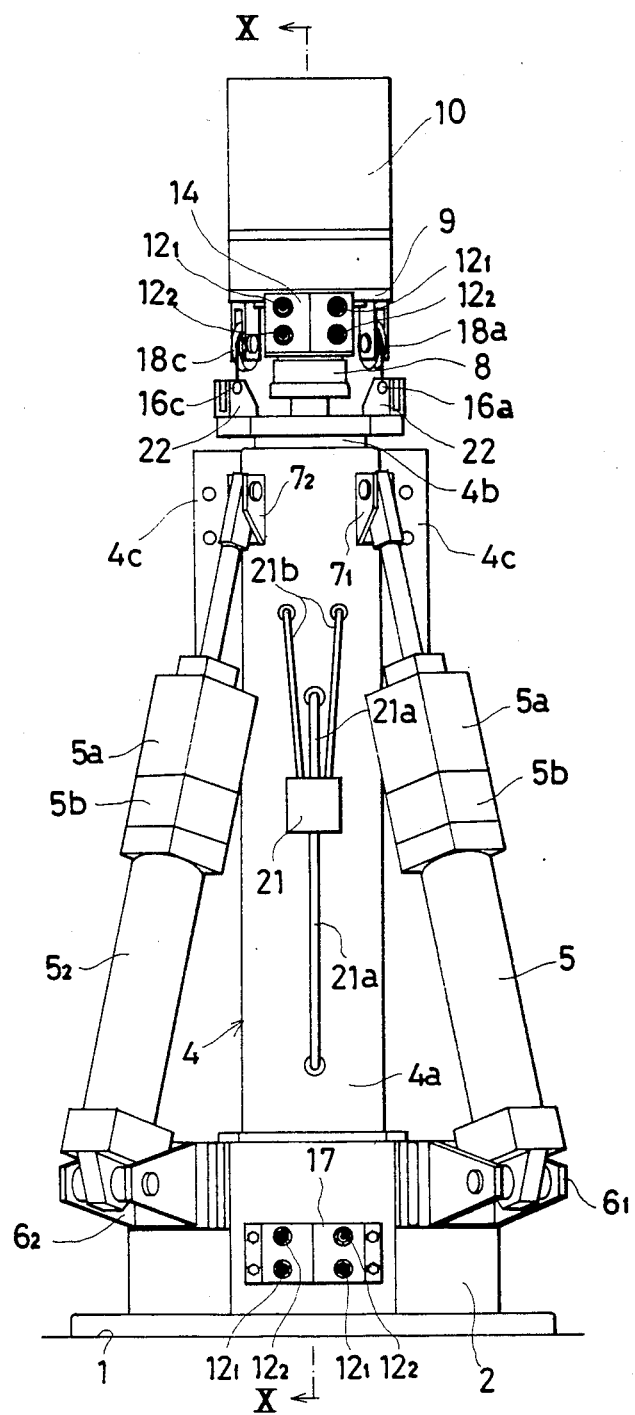
FIG. 9 is a front view of a second embodiment of this invention.
Figure 10:
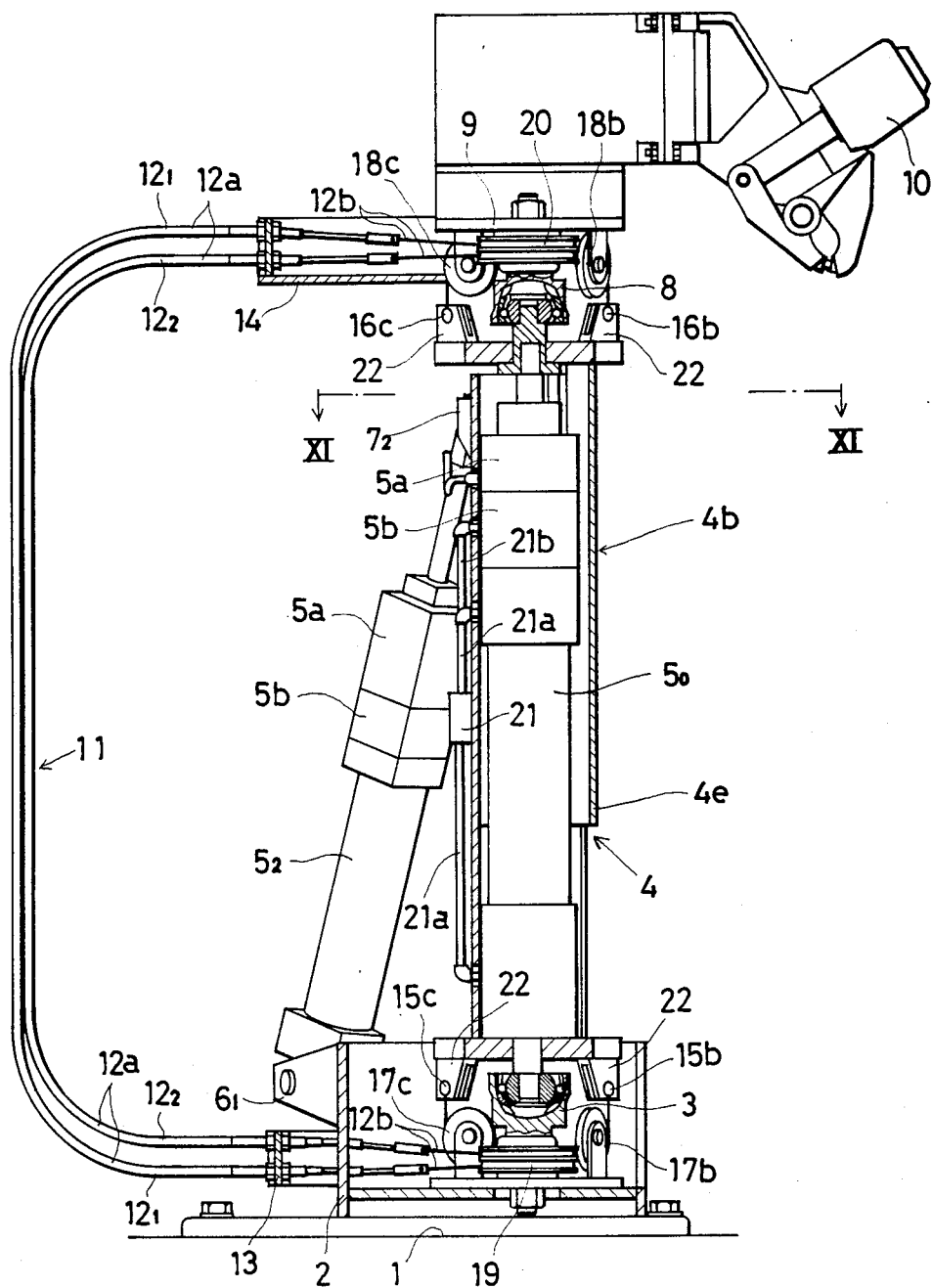
FIG. 10 is a sectional view taken along the line X—X in FIG. 9.
Figure 11:
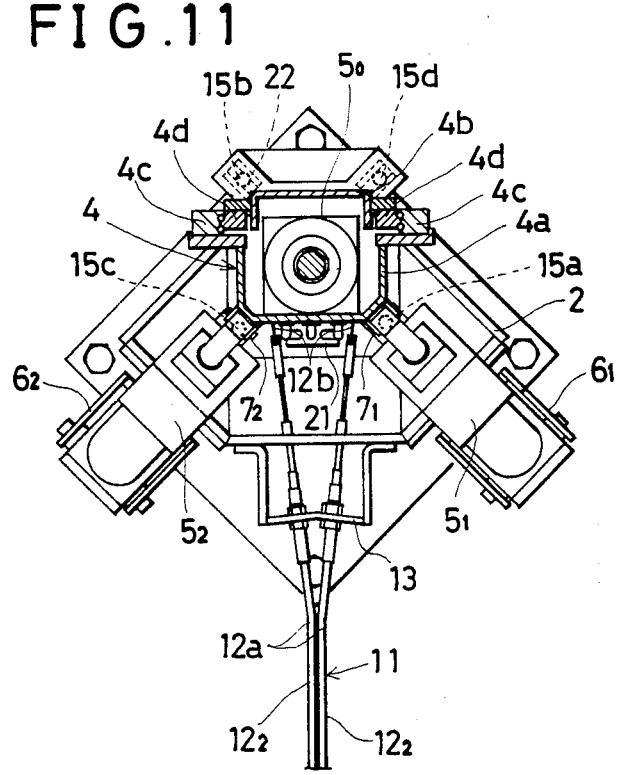
FIG. 11 is a sectional view taken along the line XI—XI in FIG. 10.

Accordingly, in order to dissolve the foregoing problems there is proposed a second embodiment shown in FIGS. 9-11. Namely, in this embodiment, the upper arm 4b is formed into a reverse L-shape in vertical cross section that has on one side a leg portion 4e which is supported by the linear guide members 4c, 4c on both sides of the open portion of the lower arm 4a so as to be movable vertically, so that the upper arm 4b can become small in weight. Additionally, the elevating cylinder $5_0$ is vertically provided along on an inner surface of such a side panel portion of the lower arm 4a that is located opposite to the leg portion 4e, and a piping manifold 21 is fixedly provided on an outer surface of the side panel portion. A pair of cylinder piping pipes 21a, 21a and a pair of brake piping pipes 21b, 21b which are extended from the manifold 21 are directly connected, by being passed through the side plate portion, to upper and lower piping connecting openings of the elevating cylinder $5_0$ and a pair of right and left piping connecting openings of the brake 5b, so that the piping installation and construction can be facilitated and simplified.

In the foregoing first embodiment, the planes for disposition of the wire anchoring portions 15a . . . 15d, and that of the wire anchoring portions 16a . . . 16d are shown as offset in the longitudinal axial direction of the robot arm 4 in relation to a X-Y plane passing through the center of rotation of the universal joint 3 and a X-Y plane passing through that of the universal joint 8. In order that the inner wire 12b may be prevented from being loosened and the accuracy and the durability thereof may be improved, it is preferable that, as in the second embodiment, the respective wire anchoring portions 15a . . . 15d and the respective wire anchoring portions 16a . . . 16d are disposed on the respective X-Y plane (FIG. 11).

Attaching brackets 22 for the wire anchoring portions project from end plates provided on upper and lower ends of the robot arm 4. The respective anchoring portions 15a . . . 15d and 16a . . . 16d comprise respective ball joints provided on the respective brackets 22.

In such a case that the wire anchoring portions 15a . . . 15d and 16a . . . 16d are not positioned on the X-Y planes passing through the centers of rotation of the respective universal joints 3, 8, when the robot arm 4 is moved to incline in the Y axis direction, for instance, the wire anchoring portions 15a, 15b, and 16a, 16b on both sides in the X axis direction are moved along on an arc loci with centers at the X axes passing through the centers of rotations of the universal joints 3, 8, and consequently the distances between the wire guide members 17a, 17b, 18a, 18b and the wire restraining portions 15a, 15b, 16a, 16b are changed. This can cause a loosening or pulling of the inner wires 12b, whereby it often happens that the horizontal accuracy of the tool attaching plate 9 in the X axis direction is lowered, or that the inner wires 12b are applied with excessive tension forces to result in lowering in durability thereof.

Figure 12:
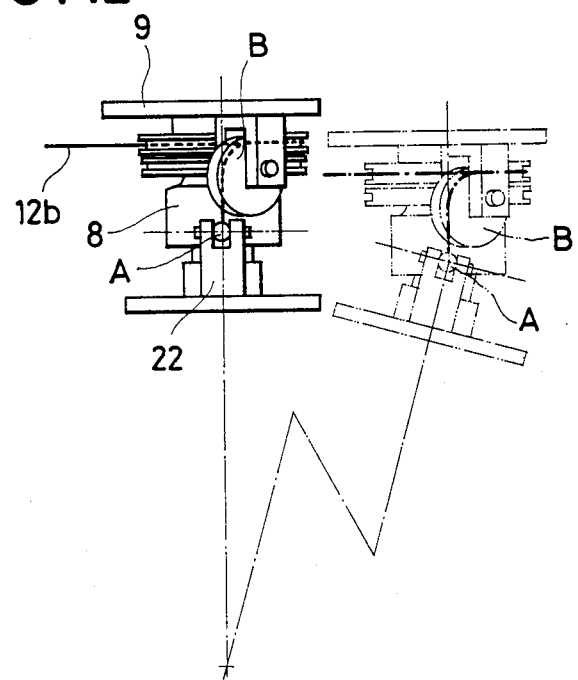
FIG. 12 is a diagram for explaining the operation thereof.

In the case where, however, the respective wire anchoring portions 15a . . . 15d and 16a . . . 16d are provided on the foregoing X-Y planes are in the second embodiment, the wire anchoring portion A positioned on the axis crossing at right angles with the inclination movement direction of the robot arm 4 can be kept positioned on that axis even by the inclination movement of the arm 4, as shown in FIG. 12. Consequently, the positional relationship between the anchoring portion A and the corresponding wire guide member B can be kept constant, and the foregoing inconveniences never take place.

Figure 13:
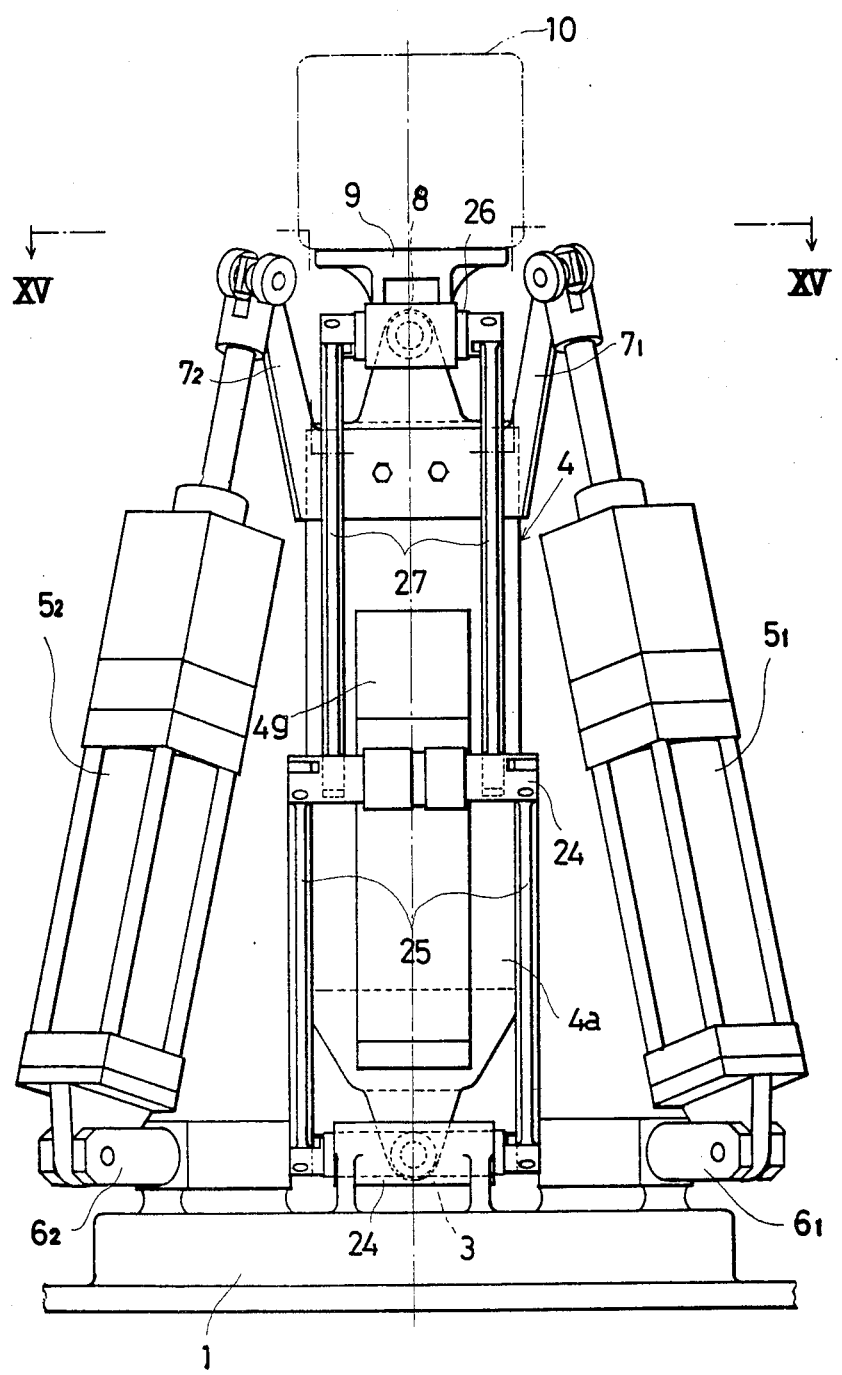
FIG. 13 is a front view of a third embodiment of this invention.
Figure 14:
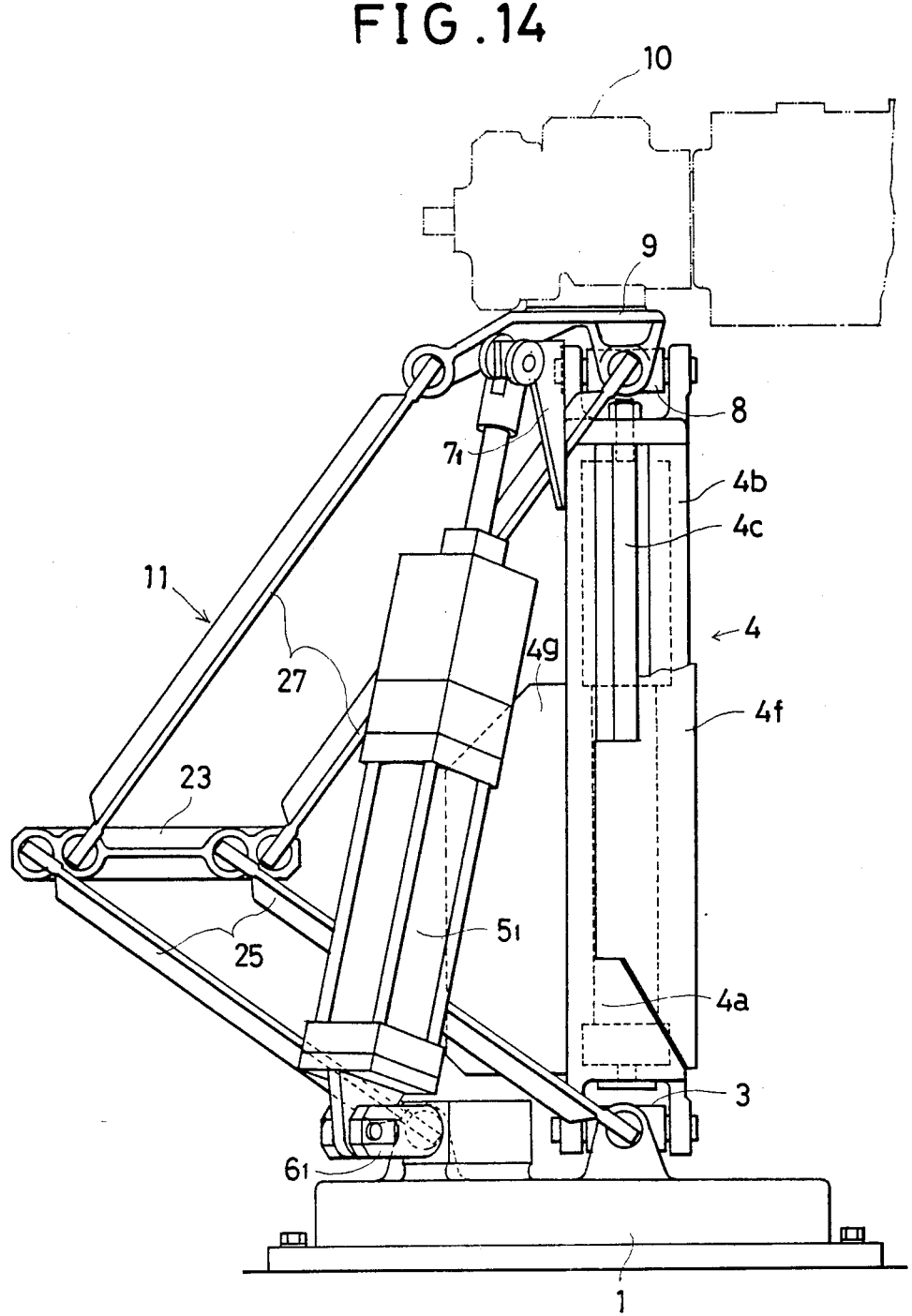
FIG. 14 is a side view thereof.
Figure 15:
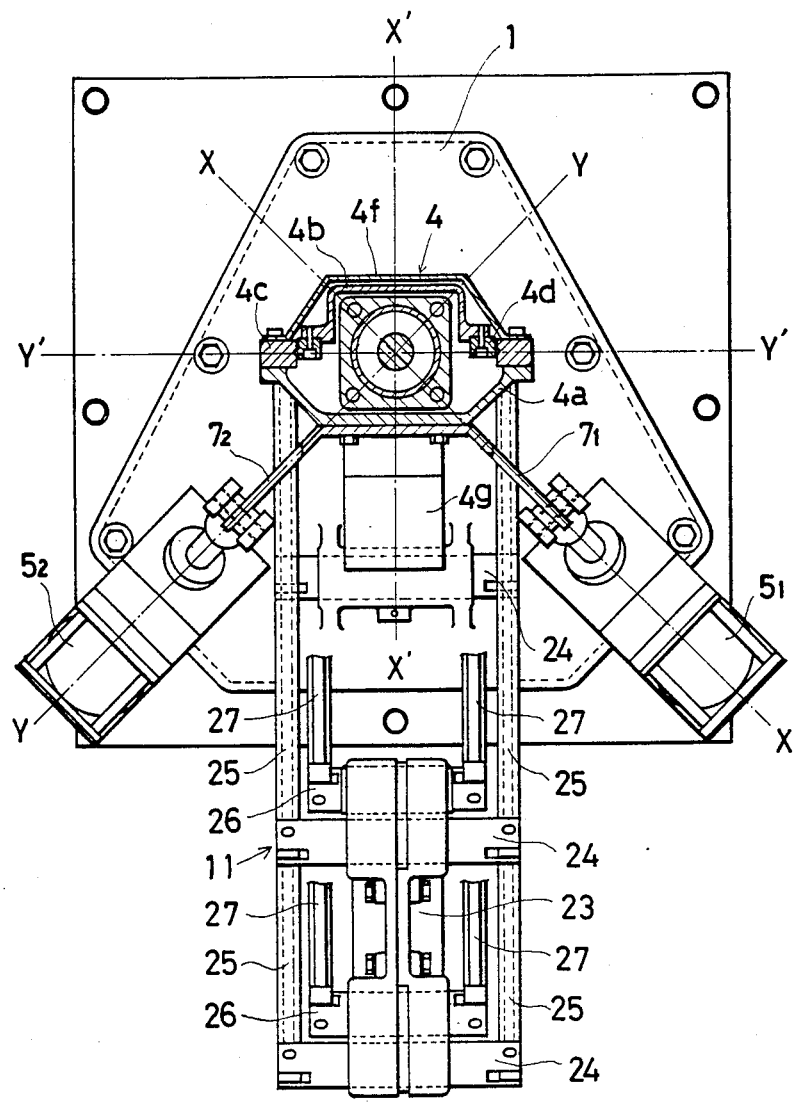
FIG. 15 is a sectional view taken along the line XV—XV in FIG. 13.
Figure 16:
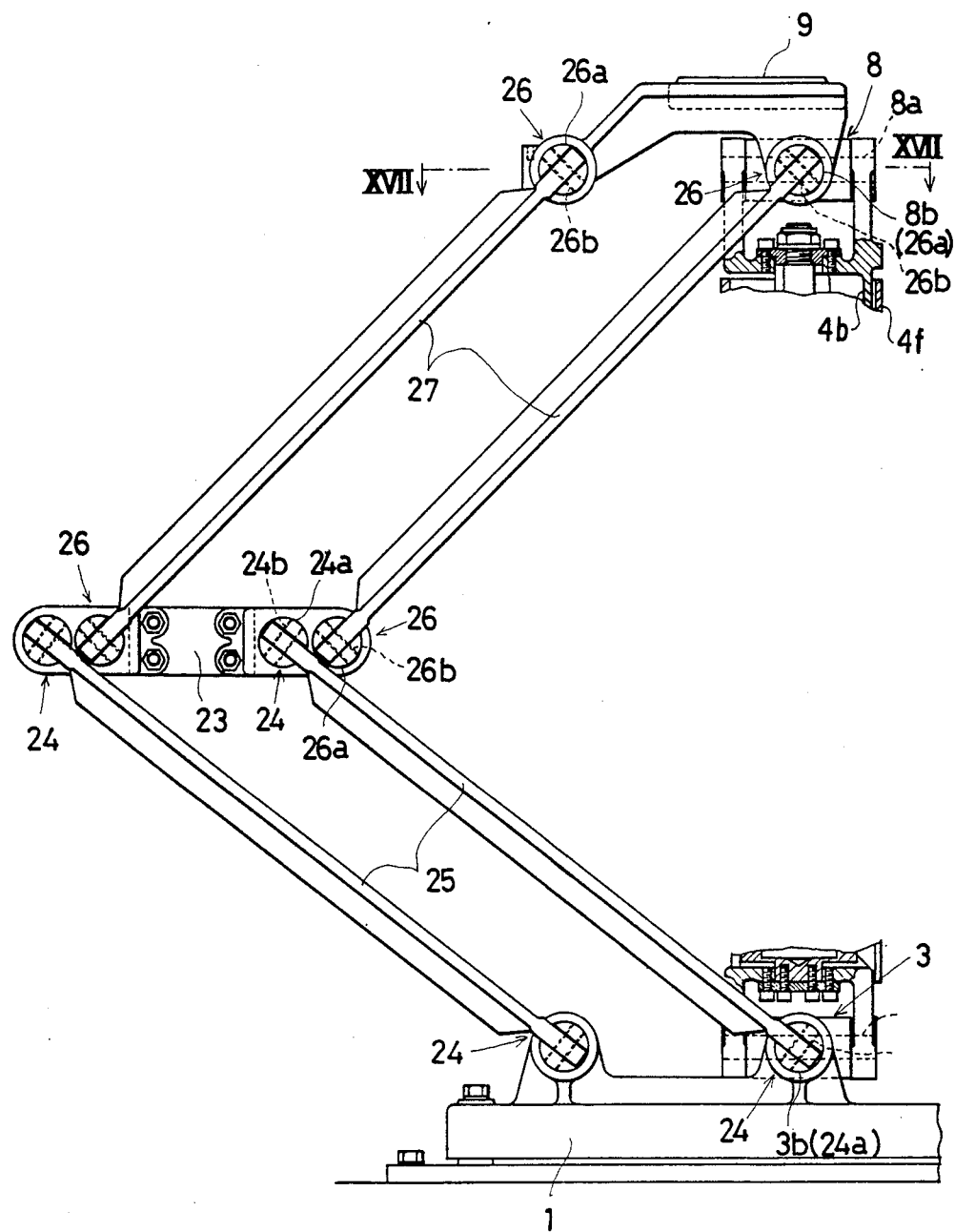
FIG. 16 is an enlarged side view showing a construction of a parallel ruler mechanism portion thereof.
Figure 17:
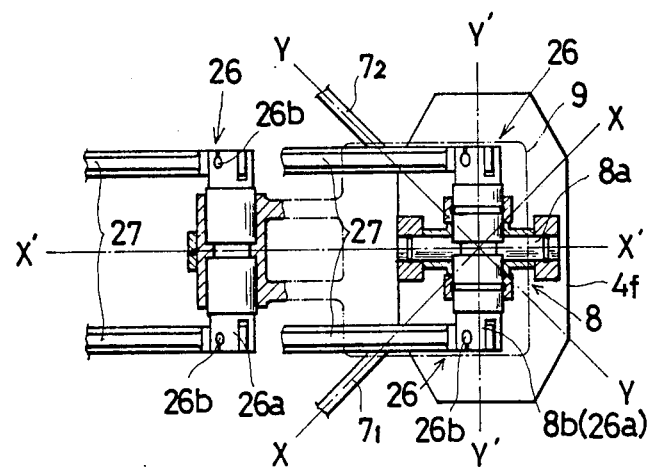
FIG. 17 is a sectional view taken along the line XVII—XVII in FIG. 16.

The parallel ruler mechanism 11 is not limited to that using the foregoing wire cables, but may comprise a link mechanism such as shown in FIG. 13 and thereafter, for instance.

To explain the same more in detail, the ruler mechanism 11 comprises at least three first parallel links 25, each having on its upper and lower ends universal joints 26, 26, for supporting a floating plate 23, which is provided between the machine base 1 and the tool attaching plate 9, so that the plate 23 may be given a parallel motion in any desired direction three-dimensionally in relation to the machine base 1, and at least three second parallel links 27, each having on its upper and lower ends universal joints 26, 26, for so supporting the attaching plate 9 that the plate 9 may be given a parallel motion in any desired direction three-dimensionally in relation to the floating plate 23. In the illustrated example of FIGS. 13-17, the ruler mechanism 11 is disposed in a space formed between the first and second cylinders $5_1$, $5_2$, and although four parallel links 25 are disclosed to maintain the floating plate 23 parallel to the machine base, only three such links are required. Likewise, four upper parallel links 27 are shown in the FIGS. 13-19 embodiment where only three such links 27 are requried to maintain the surface of the tool attaching plate 9 parallel to the floating plate 23. The foregoing at least three of the four first parallel links 25 and the foregoing at least three of the four second parallel links 24 are separately provided as to be positioned in X' axis direction and a Y' axis direction of X'-Y' coordinate axes turned by 45 degrees relative to the X-Y coordinate axes.

The foregoing universal joints 24, 26 are constructed as cross-shaped joints having pivot shafts 24a, 26a extending in the Y' axis direction and link pivot supporting pins 24b, 26b attached to the shafts 24a, 26a as to cross the same at right angles thereto. In addition, the universal joints 3, 8 on the upper and lower ends of the robot arm 4 are constructed as cross joints having pivot shafts 3a, 3b in the X' axis direction and pivots shafts 8a, 8b in the Y' axis direction. The pivot shafts 24a, 24a of the universal joints 24, 24 on the lower ends of the pair of first parallel links 25, 25 on the front side in the X' axis direction and the pivot shaft 3b of the universal joint 3 on the lower end of the arm 4 are formed into a single common shaft. Similarly, the pivot shafts 26a, 26a of the universal joints 26, 26 on the upper ends of the second parallel links 27, 27 on the front side in the X' axis direction and the pivot shaft 8b of the universal joint 8 on the upper end of the arm 4 are formed into a single common shaft, and thus the whole construction can be simplified.

Referring to the drawings, a cover 4f is attached to the lower arm 4a and surrounds the upper arm 4b, and a cover 4g is provided for the manifold 21.

Figure 7:
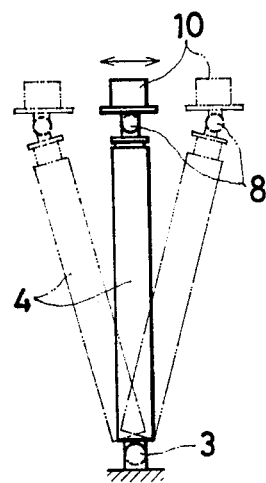
FIGS. 7 and 8 are diagrams for explaining the operations thereof.

Next, the operation of this invention will be explained as follows:

By cooperating the pair of driving sources $5_1$, $5_1$, the robot arm 4 is controlled in its inclination movement in any desired direction three-dimensionally, about the universal joint 3. By combining of the inclination movement and the expansion and contraction movements of the arm 4, it is also possible that the tool 10 attached to the tool attaching plate 9 on the upper end of the arm 4 is moved linearly. More in detail, it is possible that, as shown in FIG. 7, for instance, the tool 10 is moved linearly in right and left directions by the arm 4 being expanded or contracted while being inclined in right and left directions. It is also possible that, as shown in FIG. 8, the tool 10 is moved linearly in upper and lower directions by the arm 4 being expanded or contracted while being inclined in upper and lower directions. Additionally, in this case, by the action of the parallel ruler mechanism 11 provided between the tool attaching plate 9 and the machine base 1, the tool attaching plate 9 is moved, in relation to the arm 4, in such a direction that is opposite to the inclination direction of the arm 4, so that the same can be kept always in a constant posture, e.g., in a horizontal posture, whereby the orientation of the tool 10 can be prevented from being changed by an inclination movement of the arm 4.

Thus, according to this invention, by the three-axes control in total comprising the inclination movement control of the robot arm by the pair of driving sources and the expansion and contraction control of the arm, the tool can be moved along on any desired line in a three-dimentional space, without changing the orientation of the tool. The robot can become simpler in construction and can be obtained at lower cost, in comparison with a conventional joint type robot. The same is advantageous in that it does not require such a large installation space as the case of a rectangular coordinates type robot.

It is readily apparent that the above-described Industrial Robot meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determinin the full scope of the invention.

What is claimed is:

1. An industrial robot comprising a machine base; a first universal joint mounted on said base; an expandable and contractable robot arm provided vertically on said machine base through said first universal joint, X and Y axes being defined as horizontal axes passing through the center of rotation of the first universal joint and crossing at right angles one to another and a Z axis being defined as a longitudinal axis of the arm passing through the center of rotation of the first universal joint; a pair of driving sources for causing the arm to incline in the X axis direction along on a X-Z plane defined by the X and Z axes and in the Y axis direction along on a Y-Z plane defined by the Y and Z axes provided on the machine base and connected to said arm so that the arm may be moved to incline in any desired direction by the cooperation of the two driving sources; a tool attaching plate attached to an upper end of the arm through a second universal joint having its center of rotation positioned on the Z axis; a floating plate intermediate said tool attaching plate and said machine base, at least three links each having third universal joints on upper and lower ends thereof and respectively attached to said floating plate and said machine base so the floating plate will remain parallel to the base when moved in any desired direction, at least three additional links each having fourth universal joints on upper and lower ends thereof and respectively attached to said tool attaching plate and said floating plate so the tool attaching plate will remain parallel to said floating plate when moved in any desired direction whereby said tool attaching plate will remain parallel to said machine base in all positions of movement of said upper end of said robot arm.

2. An industrial robot as claimed in claim 1, wherein the robot arm comprises a lower arm connected to the machine base through the universal joint, and an upper arm vertically movably supported on the lower arm, and the two driving sources comprise cylinders which are located on the X-Z plane and the Y-Z plane, respectively, and are disposed between the periphery of the lower arm and the machine base so as to interconnect the two.

3. An industrial robot as claimed in claim 2, wherein the lower arm is formed into a nearly channel-shape in horizontal cross section, with its one side surface being open, and a pair of linear guide members, each being extended longitudinally in the vertical direction, are fixedly provided on both sides of an open portion thereof, and an elevating cylinder is vertically provided in the lower arm so that the upper arm may be moved upwards and downwards by the elevating cylinder along on the linear guide members.

4. An industrial robot as claimed in claim 3, wherein the upper arm is formed into a vertically-oriented reverse L-shape in vertical cross section that has on one side thereof a leg portion which is supported by the linear guide members so as to be movable vertically along on the same; the elevating cylinder is provided vertically to extend along on an inner surface of a side panel portion of the lower arm located opposite to the leg portion of the upper arm; a piping manifold is fixedly provided on an outer surface of the side plate portion; and pipes extending from the piping manifold are directly connected to connecting opening of the elevating cylinder by being passed through the side panel portion of the lower arm.

* * * * *